United States Patent [19]

Myer

[11] Patent Number: 4,582,243

[45] Date of Patent: Apr. 15, 1986

[54] EXTREME PRESSURE BELTED STRUCTURES AND ASSEMBLY METHOD THEREFOR

[75] Inventor: Jon H. Myer, Woodland Hills, Calif.

[73] Assignee: Hughes Aircraft Company, Los Angeles, Calif.

[21] Appl. No.: 682,569

[22] Filed: Dec. 14, 1984

Related U.S. Application Data

[60] Continuation of Ser. No. 302,891, Sep. 16, 1981, abandoned, which is a division of Ser. No. 137,092, Apr. 4, 1980, Pat. No. 4,308,044.

[51] Int. Cl.⁴ ............................................. B23K 20/12
[52] U.S. Cl. ......................................... 228/115; 29/453; 29/458; 29/525; 228/208; 228/251; 76/107 R; 285/286; 403/272
[58] Field of Search .................... 29/525, 458, 446; 285/286; 228/115, 116, 208, 254, 251, 263, 18; 403/271, 272; 76/107 R, 107 A, 107 S; 65/1

[56] References Cited

U.S. PATENT DOCUMENTS

| | | | |
|---|---|---|---|
| 1,066,290 | 7/1913 | Kraus | 228/251 X |
| 1,817,680 | 8/1931 | Pratt | 76/107 A X |
| 2,146,995 | 2/1939 | Simons | 76/107 A |
| 2,232,417 | 2/1941 | Unckel | 76/107 A |
| 3,013,657 | 12/1961 | Altwicker | 76/107 A X |
| 3,032,870 | 5/1962 | Rohrberg et al. | 228/251 X |
| 3,252,204 | 5/1966 | McFadden | 228/208 X |
| 3,427,707 | 2/1969 | Nowosadko | 228/251 X |

Primary Examiner—Charlie T. Moon
Attorney, Agent, or Firm—L. B. Sternfels; V. G. Laslo; A. W. Karambelas

[57] ABSTRACT

A die (40) for extrusion of optical grade fibers has its hard insert (42) placed under compression within a sleeve (44). Sleeve (44) is provided with a tapered interior surface (50) which matches the tapered exterior surface (48) of the insert (42). A metal lubricating layer (60) is provided between the tapered surfaces. The insert is pressed in to obtain compressive prestressing thereof, and the lubricating metal diffuses at the tapered surfaces to lock the insert in the sleeve.

7 Claims, 3 Drawing Figures

EXTREME PRESSURE BELTED STRUCTURES AND ASSEMBLY METHOD THEREFOR

This is a continuation of application Ser. No. 06/302,891 filed Sept. 16, 1981, now abandoned, in turn a division of application Ser. No. 06/137,092 filed Apr. 4, 1980, now U.S. Pat. No. 4,308,044 which was patented Dec. 29, 1981.

BACKGROUND OF THE INVENTION

1. Field of the Invention

The present invention relates to a method for assembly of high pressure vessels.

2. Description of the Prior Art and Background Considerations

The fabrication of containers for extreme pressures was originated and developed by P. W. Bridgman where concentric prestressed belts of high strength alloys are assembled about a container wall to place the innermost layer thereof under compression. Conventionally, prestressing is achieved by heating and expanding the outer belts with respect to the inner layers of the container. Upon assembly and cooling, the belts contract upon the inner layers. Such thermal expansion is limited to small dimensional changes, and does not easily generate large dimensional changes, e.g., approximately one percent. In addition, even if sufficient expansion were obtainable by thermal means, the required high temperatures would change the mechanical properties of the components. Therefore, it has been necessary to look to other means by which the necessary pre-stress can be obtained.

In the fabrication of certain types of optical fibers, extrusion at high pressure is employed. The cylinder surrounding the extrusion piston used in this application must be of great strength and be capable of containing the very high pressures developed during extrusion. In the present invention, sintered carbides, such as tungsten or titanium, were found suitable for the extrusion cylinder. These materials have the necessary strength and have no chemical or physical effect on the extruded fiber. However, these high strength materials are also brittle and have a tendency to crack under tension. Therefore, it is necessary to fashion the sintered carbide as a tubular insert and to enclose it under great compressive pre-stress within a sleeve of hardened tool or tempered alloy steel so that, even during the application of the high extrusion pressures therein, there would still be some remaining compressive force exerted upon the carbide insert. To assemble the insert in the sleeve for the reasons described above, thermal expansion and contraction was insufficient to generate the required large dimensional changes of about one percent. Also, as stated above, any heating necessary to obtain a thermal expansion would destroy the temper of the components.

Therefore, the titanium carbide die was inserted into the hardened tool steel sleeve first by concentrically tapering the mating surfaces of the insert and the sleeve with a slight oversizing of the insert with respect to the sleeve, and then by axially compressing the insert into the sleeve. Such a method of assembly, however, gave rise to a dual, contradictory problem in that low friction during assembly, and high friction after assembly for retention of the insert within the sleeve were required. For example, a titanium carbide insert lubricated with a high pressure lubricant and retained in a sleeve, was expelled with explosive force after release of the assembly pressure, even though the taper angle of the mating surfaces was only 1.2°. Yet, if no lubricant were used, the assembly process would have caused galling, resulting in a scored interface between the insert and the sleeve with unknown and undesired mechanical properties.

SUMMARY OF THE INVENTION

Resolution of these and other problems was obtained by the present invention by providing lubrication of the tapered surfaces during assembly, and locking of the assembly after its completion by mechanical and metallurgical techniques.

Mechanically, mateable grooves are formed in the cooperating tapered surfaces of the insert in the sleeve. In the preferred embodiment, a radially compressible ring is installed in the external cylinder insert groove. During axial compression with lubrication, the ring does not project above the adjacent surface but is squeezed into its groove until total insertion is completed. As soon as the tapered insert reaches its desired penetration within the sleeve, the ring expands and snaps into the juxtaposed groove and firmly and permanently locks the assembly together.

Alternately, a radially expandable ring may be retained in the internal groove of the sleeve; however, in this case, a special pilot pin must be inserted into the sleeve to permit expansion of the ring, and assembly of the insert.

Metallurgical locking is obtained by coating the insert and/or the sleeve with a metal which is capable of lubricating the interface during assembly and which will subsequently diffuse into the surrounding metals of the insert and the sleeve to lock them together. Typical metals include gold, copper, silver, nickel and aluminum.

It is, therefore, an object of the present invention to provide for a low friction assembly and permanent bond of concentric taper belted high pressure containers.

Another object of the present invention is to provide for assembly of ultra-high pressure vessels without use of thermal expansion techniques.

Other aims and objects as well as a more complete understanding of the present invention will appear from the following explanation of exemplary embodiments and the accompanying drawings thereof.

DETAILED DESCRIPTION OF THE INVENTION

Figure 1:
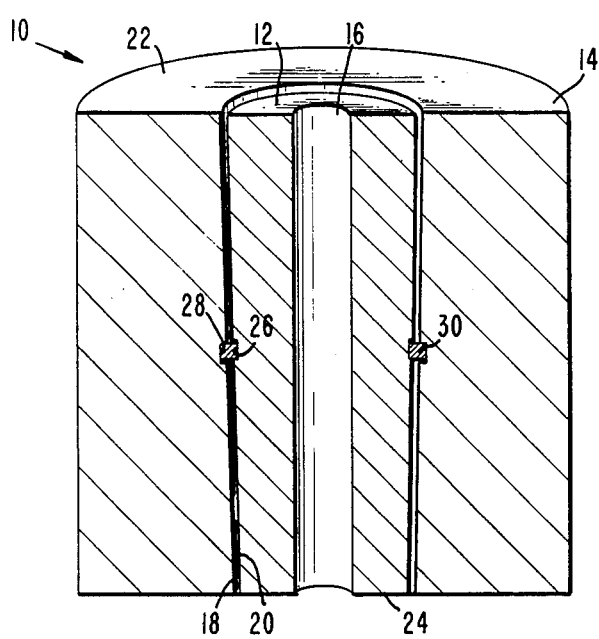
FIG. 1 depicts a first embodiment of the present invention illustrating a mechanical locking technique, with the taper of, and the spacing between, component parts being greatly exaggerated.
Figure 2:
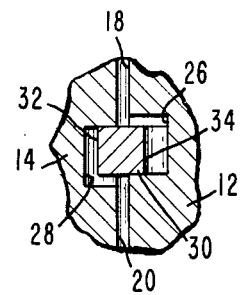
FIG. 2 is an enlarged view of a mechanical interlocking of FIG. 1.

As shown in FIGS. 1 and 2, an assembly 10, useful, for example, in extrusion of optical fibers, comprises a cylinder or insert 12 held and locked within a sleeve 14. The cylinder is provided with a bore 16 through which the fiber materials are pushed for extrusion. Exemplary cylinder materials comprise tungsten or titanium carbide which are placed under precompression by being oversized with respect to the sleeve. To maintain the proper compressive forces on insert 12, sleeve 14 may be formed of a hardened tool or tempered alloy steel.

In order to form the assembly, insert 12 and sleeve 14 are formed respectively with exterior and internal tapered surfaces 18 and 20, with a taper decreasing from the top 22 of the assembly to its bottom 24. An exemplary taper angle may be 1.2°.

Assembly is effected by positioning insert 12 at top surface 22 and axially forcing the insert along internal surface 20 with a hydraulic press until the tops of the insert and the sleeve are nearly flush with each other. To insure that the two components remain interlocked, grooves 26 and 28 are formed respectively externally on the cylinder insert and internally in the sleeve are positioned to face one another when the insert and the sleeve are completely assembled together. A split ring 30 effects the interlock. The ring is originally compressed so that it will reside within groove 26 in its compressed state without projecting beyond the external surface of the tapered insert. The only condition of compression is that the ring's outer surface 32 slide within internal surface 20 of the sleeve.

For assembly, the ring is either compressed into external groove 26 on carbide insert 12 or expanded into internal groove 28 in the sleeve and a lubricant placed on surfaces 18 and 20. The tapered insert is axially introduced into the sleeve and, after it has reached the desired penetration within sleeve 14, ring 30 expands or contracts into its juxtaposed groove to firmly and permanently interlock the assembly.

Figure 3:
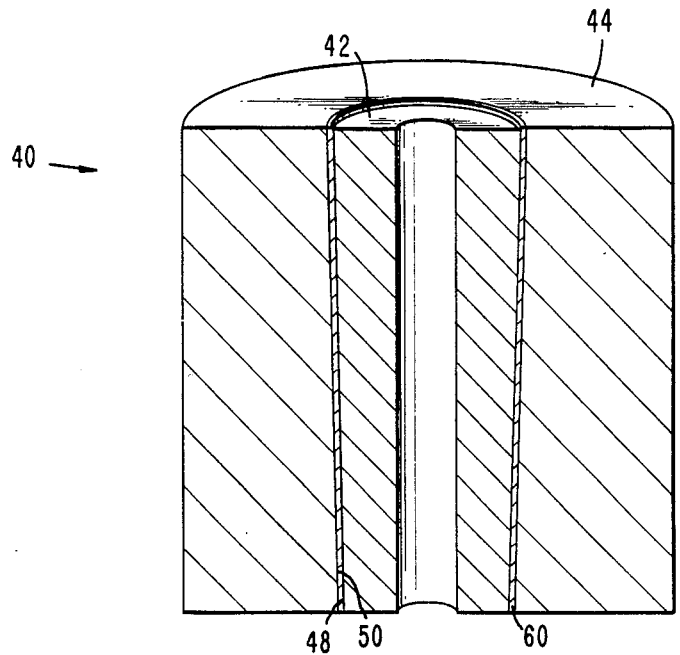
FIG. 3 illustrates the metallurgical technique of interlocking the components, again shown with great exaggeration of the taper of and spacing between the parts.

Metallurgical locking is illustrated with respect to FIG. 3 in which assembly 40 includes an insert 42 and sleeve 44, which are similarly configured as the sleeve and insert of FIGS. 1 and 2. In a like manner, insert 42 is provided with an external tapered surface 48 and sleeve 44 is provided with an internal tapered surface 50. The interlocking medium here, however, comprises a metal 60 which is placed on one or both of surfaces 48 and 50. The metal must also be capable of acting as a lubricant. Examples include gold, copper, silver, nickel and aluminum. In one experiment, a layer of gold 5 micrometers thick was placed on an insert of titanium carbide. Insert 42 was placed in position to be axially driven within sleeve 44. Metal 60 of gold provided the necessary lubrication and, after completion of the two component assembly, the gold diffused into the insert and the sleeve to form a metallurgical diffusion bond therebetween at their surfaces 48 and 50.

Although the invention has been described with reference to particular embodiments thereof, it should be realized that various changes and modifications may be made therein without departing from the spirit and scope of the invention.

What is claimed is:

1. A method for assembling a prestressed extrusion die, comprising the steps of:
   providing a sleeve having an opening defined by a tapered inner surface;
   providing an insert comprising material which is weak in tension and having a tapered outer surface and an inner extrusion bore, in which the outer surface is sized with respect to the inner surface so that, when the insert is placed within the sleeve, the inner and outer surfaces are adjacent each other and the insert will be placed under compression by the sleeve;
   coating matter having lubricating and bonding characteristics on at least one of the tapered surfaces;
   pressing the insert into and within the sleeve aided by the matter's lubricating characteristic to prestress the insert; and
   bonding the insert and the sleeve together by use of the matter's bonding characteristic.

2. A method for assembling a prestressed belted structure useful as an extrusion due, comprising the steps of:
   providing a metallic sleeve having an opening defined by a tapered inner surface;
   providing a metal insert having a tapered outer surface and a through extrusion bore, in which the outer surface is sized with respect to the inner surface so that, when the insert is placed within the sleeve, the surfaces are adjacent each other and the insert is compressed by the sleeve;
   coating a lubricant metal on at least one of the tapered surfaces in which the lubricant metal comprises one of gold, copper, silver, nickel and aluminum;
   assembling the insert and the sleeve so that the surfaces are concentric and are separated substantially only by the metallic lubricant by pressing the insert into the sleeve with the aid of the lubricant metal, thereby to (compress) the insert; and
   locking the insert and the sleeve together by diffusing the metal lubricant into the insert and the sleeve at their surfaces for preventing slippage therebetween.

3. A method according to claim 2 in which the lubricant metal comprises an approximately 5 micrometer layer of gold, the insert comprises tungsten carbide, and the sleeve comprises tempered alloy steel.

4. A method according to claim 2 in which the surfaces are concentric and the taper of the tapered surfaces in the sleeve and on the insert is substantially 1.2° to the longitudinal axes thereof.

5. A method according to claim 2 in which the tapered surfaces in the sleeve and on the insert have a substantially 1.2° taper along their longitudinal axes.

6. A method for assembling a prestressed belted structure useful as an optical fiber extrusion die, comprising the steps of:
   providing a metallic sleeve having an opening defined by a (tapered inner surface);
   providing a metal containing insert having a tapered outer surface, the outer surface being sized with respect to the inner surface so that, when the insert is placed within the sleeve, the inner and outer surfaces are adjacent each other;
   providing a through bore in the insert for the use of the prestressed structure as a die for extruding optical fibers;
   coating a metallic lubricant on at least one of the tapered surfaces;
   pressing the insert into and within the sleeve to compressively prestress the insert; and
   locking the insert and the sleeve together by permitting diffusion of the metallic lubricant into the insert and the sleeve for preventing slippage therebetween.

7. A method for assembling a prestressed extrusion die comprising the steps of:
   providing a sleeve having an opening therein defined by a tapered inner surface having a taper angle of substantially 1.2° along its longitudinal axis;

providing a brittle insert with an extrusion bore therein in which the insert has an outer surface sized to the opening in the sleeve so that the insert can be inserted into the sleeve under compression, with the outer surface being tapered at substantially the same angle as the opening in the sleeve;

lubricating at least one of the tapered surfaces by coating a lubricant thereon having also the capability of bonding the surfaces together;

inserting the insert into the sleeve so that the tapered surfaces contact with the lubricant inbetween and so that the sleeve compresses the insert; and bonding the insert and the sleeve together by the lubricant for preventing slippage therebetween.

* * * * *